United States Patent [19]

Riesmeyer

[11] Patent Number: 4,841,568
[45] Date of Patent: Jun. 20, 1989

[54] CIRCUIT ARRANGEMENT FOR A TELEPHONE STATION WITH EARTH CONNECTION TO THE CENTRAL SUPPLY DEVICE

[75] Inventor: Juergen Riesmeyer, Olching, Fed. Rep. of Germany

[73] Assignee: Siemens Aktiengesellschaft, Berlin and Munich, Fed. Rep. of Germany

[21] Appl. No.: 153,319

[22] Filed: Feb. 8, 1988

[30] Foreign Application Priority Data

Mar. 24, 1987 [DE] Fed. Rep. of Germany ....... 3709537

[51] Int. Cl.⁴ .......................................... H04M 1/00
[52] U.S. Cl. ..................................... 379/380; 379/387
[58] Field of Search ............... 379/387, 380, 382, 377, 379/352, 258, 362, 412, 350

[56] References Cited

U.S. PATENT DOCUMENTS

| | | | |
|---|---|---|---|
| 4,251,693 | 2/1981 | Christiansen | 379/387 |
| 4,313,037 | 1/1982 | Shepard | 379/387 X |
| 4,614,843 | 9/1986 | Coulmance | 379/377 X |

Primary Examiner—Jin F. Ng
Assistant Examiner—Randall S. Vaas

[57] ABSTRACT

A circuit arrangement for a telephone station with earth connection to the central supply device for the purpose of post-dialing signaling, operates independently of whether the negative or the positive pole of the exchange battery is earthed. This is achieved by provided that, on the actuation of the earthing key, the earth connection of the telephone is connected to the unearthed pole of the exchange battery via a transistor network which functions differently in dependence upon the polarity of the exchange battery earthing. The circuit arrangement is universally suitable for PBX exchanges.

1 Claim, 1 Drawing Sheet

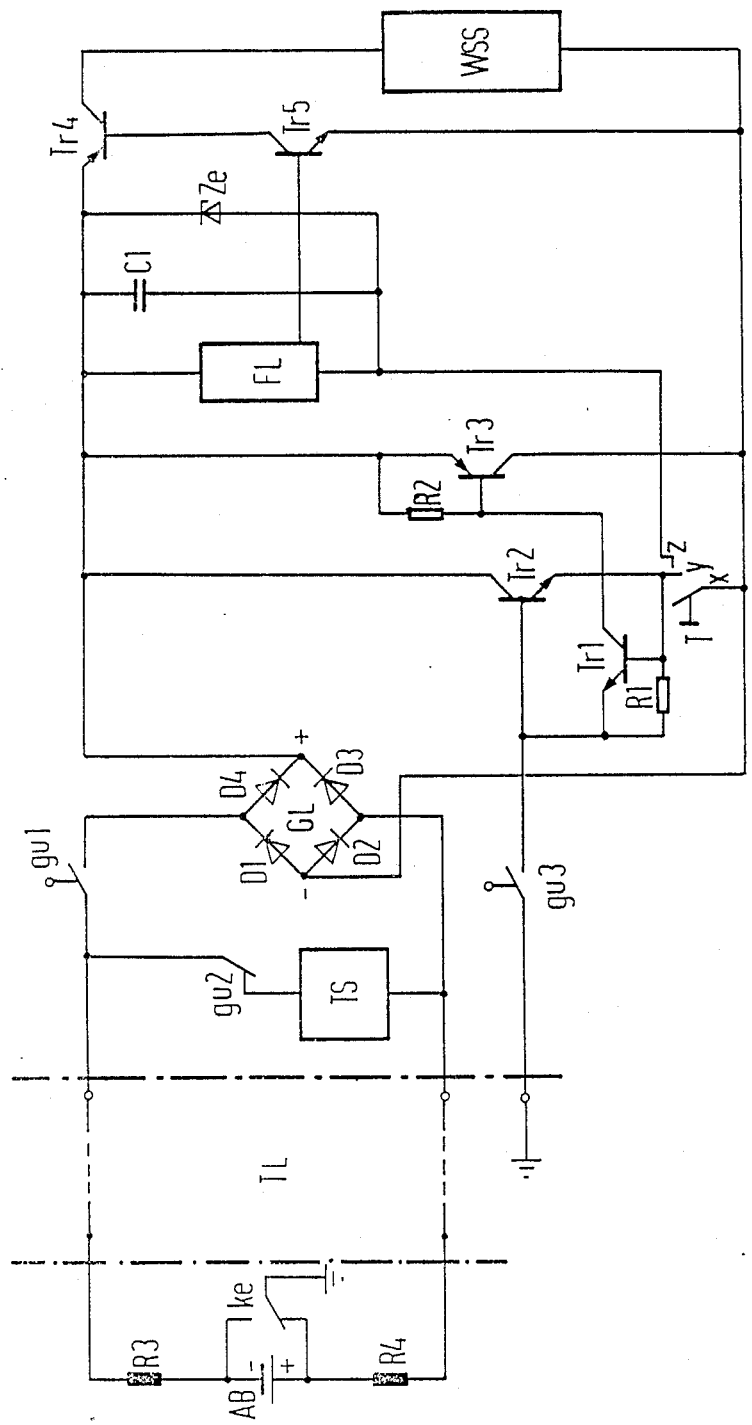

CIRCUIT ARRANGEMENT FOR A TELEPHONE STATION WITH EARTH CONNECTION TO THE CENTRAL SUPPLY DEVICE

BACKGROUND OF THE INVENTION

The invention relates to a circuit arrangement for a telephone station with earth connection to the central supply device for the purpose of post-dialing, where the telephone station is assigned a dialing and speech circuit, a polarity reversal protection device and a flash circuit.

The central exchange (telephone exchange) requires, for example, for post-dialing signals (consultation, etc.), a signaling mode which is in addition to the normal dialing information. It is dependent upon the central exchange whether signaling must take place by "flash" (loop interruption) or by grounding the ungrounded pole of the central supply device. Grounding or flash are triggered by the same key. A circuit arrangement has already been proposed in which the telephone station is automatically switched, depending upon the central exchange, to function for flash or signaling. If a signal is required, earth is connected to the earth terminal point of the telephone station. If no earth is connected, a flash function mode automatically exists. However, this circuit arrangement operates in the aforementioned manner when an earth signal is required only if the positive pole of the central supply device is earthed.

SUMMARY OF THE INVENTION

Therefore, the aim of the present invention is to provide a circuit arrangement of the aforementioned type in which the earth signaling is additionally independent of the type of the earthed pole in the central supply device.

This is achieved by providing a key with a double-make contact, the fixed contact side of which is connected to the negative potential of the polarity protection device, with the rest side of the first actuated make contact being first connected to the base and, via a resistor, to the emitter of a first NPN-transistor and earth potential, and secondly (in the actuated state) connects the outputs of the polarity protection device via the collector-emitter path of a second NPN-transistor which is connected by its base to earth potential, with the collector of the first NPN-transistor being connected to the base of a PNP-transistor whose emitter-collector path is connected between the outputs of the polarity protection device, and that the rest side of the second (subsequently actuated) make contact, which is connected to the first make contact, is connected to the positive output of the polarity protection device via a Zener diode which is arranged in parallel to the flash circuit and in parallel to a supply capacitor.

This results in the advantage that when earth signaling is required, when the positive pole of the central supply device is earthed, then the negative pole is always earthed, and when the negative poled is earthed, the positive pole is always earthed. On disconnection of earth from the telephone station, the flash signal takes place automatically.

BRIEF SUMMARY OF THE DRAWING

The function of the circuit arrangement will be explained making reference to a FIGURE which illustrates an illustrative embodiment of the invention.

DESCRIPTION OF THE PREFERRED EMBODIMENT

The FIGURE illustrates the central supply device, composed of the exchange battery AB, the supply resistors R3 and R4 and an earthing contact ke. The FIGURE also shows a subscriber line TL, a ringing circuit TS, a polarity protection device GL (comprising the diodes D1 to D4, a flash circuit FL, a dialing and speech circuit WSS, a key T with the contact switch-over point x, y, z, the hybrid switch-over contact gu1, gu2, gu3, the transistors Tr1 to Tr5, the Zener diode Ze, the capacitor C1, the resistors R1, R2 and the earth terminal point E.

In the aforementioned FIGURE, by way of an example, the positive pole of the central supply device has been shown to be earthed. A condition of this circuit arrangement is that on the actuation of the key T, first the contact y and only then the contact z is closed.

If, when the handset is lifted (gu1, gu3 closed, and gu2 opens to cut off the ringing circuit) and, because an earth signal is required, earth is connected from the earthing point E to the base of the transistor Tr2, the key T is actuated, and the following earthing path is formed for the earthing of the negative pole of the central supply device; earth, E, gu3, Tr2, T (y,x), D1 (G1), gu1, TL, R3-AB. Here the current flows across Tr2 as base current. At the same time the transistor Tr2 short-circuits the outputs of the polarity protection device GL, so that the capacitor C1, which serves to supply the flash circuit when the key T is released, cannot charge. Thus, when the key T is released, no flash signal can be given. With the described potential, the transistor Tr1 is in the blocked state, thus the transistor Tr3 is also cut off. As a result, the negative wire of the polarity reversal protection device GL is always earthed independently of the polarity on the subscriber line TL.

If earth signaling is required by the central device and the negative pole of the exchange battery is earthed (with ke switched-over), for the earthing of the positive pole of the exchange battery AB, the following earthing path occurs: earth, E, gu3, Tr1 (base current), T (xY), WSS, Tr4, D3 (GL), TL, R4, AB+.

Tr1 is rendered conductive by the flow of the earthing current (base-emitter current) and renders the transistor Tr3 conductive, controlled by the bias resistor R2. Tr3 short-circuits the dialing and speech circuit WSS and the flash circuit so that when the key T is released, no flash can take place. The transistor Tr3 functions as soon as the key contacts xy are closed, so that again the supply capacitor C cannot charge. Therefore, it is again necessary to successively actuate the contacts of the T-key. The transistors Tr1 and Tr3 behave in the manner of a thyristor which is ignited via the resistor of the dialing and speech circuit WSS. The transistor Tr3 switches the earthing path low-ohmic following the "ignition".

If the central exchange were to request fresh signaling, the earth must be cut off at the earthing point E. If the key T is now actuated, the transistors Tr1, Tr2 and Tr3 remain cut off and the capacitor C1 can charge by the potential provided GL. When the key T is released, via the transistor Tr5 the flash circuit blocks the flash transistor Tr4 for the input time. During this time the flash circuit is supplied with potential by the capacitor C1.

It will be apparent that various modifications and/or additions may be made in the apparatus of the invention without departing from the essential feature of novelty involved, which are intended to be defined and secured by the appended claims.

I claim:

1. A circuit arrangement for a telephone station with earth connection to a central supply device for the purpose of post-dialing said telephone station having a dialing and speech circuit, a polarity reversal protection device and a flash circuit, comprising, in combination a key (T) with a double-make contact (y,z), a fixed contact side of which is connected to a negative terminal of the polarity reversal protection device (GL), a rest side of a first actuated make contact (y) being connected to the base of a first NPN-transistor (Tr1) and, via a resistor (R1) to the emitter of said NPN-transistor (Tr1) and to earth potential, and in the actuated state, interconnects output terminals of the polarity reversal protection device (GL) via the collector-emitter path of a second NPN-transistor (Tr2) which is connected by its base to earth potential, the collector of said first NPN-transistor (Tr1) is connected to the base of a PNP-transistor (Tr3) whose emitter-collector path is connected between said output terminals of the polarity reversal protection device (GL), and connected to a rest side of a second actuated make contact (z), which is selectively connected to the first make contact (y) and to a positive output of the polarity reversal protection device (GL) via a Zener Diode (Ze), which is arranged in parallel to the flash circuit and in parallel to a supply capacitor (C1).

* * * * *